United States Patent Office 3,290,337
Patented Dec. 6, 1966

3,290,337
AZIDOCARBONYLCYCLOPENTADIENYL MANGANESE TRICARBONYL AND PROCESS FOR PREPARING SAME
John Kozikowski, Walled Lake, Mich., and Michael Cais, Haifa, Israel, assignors to Ethyl Corporation, New York, N.Y., a corporation of Virginia
No Drawing. Original application Dec. 28, 1960, Ser. No. 78,820. Divided and this application May 3, 1965, Ser. No. 463,419
4 Claims. (Cl. 260—349)

This application is a division of application Serial No. 78,820, filed December 28, 1960. This invention relates to a variety of organometallic compounds and the processes employed in their production. More specifically, this invention relates to compounds and processes involving the use of an acylcyclopentadienyl manganese tricarbonyl compound.

An object of our invention is to provide new organometallic compounds and processes for their preparation. A further object is to provide acylcyclopentadienyl manganese tricarbonyl derivatives and processes for their preparation. Additional objects will become apparent from a reading of the specification and claims which follow.

The parent compound employed in our process is, as stated above, an acylcyclopentadienyl manganese tricarbonyl. These compounds have the general formula:

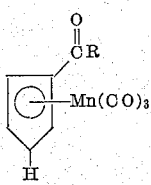

and are prepared by the process described in U.S. Patent 2,916,503. In the above formula R is a hydrocarbon group containing from one to twenty carbon atoms which can be, for example, an alkyl, aryl, or cycloalkyl group. The process by which these compounds are made is illustrated by the following example in which all parts and percentages are by weight unless otherwise indicated.

Example I

Acetylcyclopentadienyl manganese tricarbonyl was prepared by adding 78.8 grams (1.0 mole) of acetyl chloride dropwise to a stirred mixture of 204 grams (1.0 mole) of cyclopentadienyl manganese tricarbonyl, 160 grams (1.24 moles) of aluminum chloride and 800 ml. of carbon disulfide under a nitrogen atmosphere. The temperature at the beginning was 25° C. and during the hour required to complete the addition it rose to 40° C. Stirring was continued for an additional 1½ hours. Then the acetylcyclopentadienyl aluminum trichloride complex was allowed to settle and the greater part of the carbon disulfide was decanted. The residues were chilled and cold dilute hydrochloric acid was added with vigorous stirring until all of the solids dissolved. Ether was added until the organic layer floated. Saturated potassium chloride solution was used to break the emulsion. The layers were separated, the solvents removed by distillation and the residues distilled at ~2 mm. through a spinning band column at 104–105° C. There was obtained 213 grams of acetylcyclopentadienyl manganese tricarbonyl which was 86.5 percent of theory.

The acylcyclopentadienyl manganese tricarbonyl compound, as prepared in the previous example, may be further reacted with a halogen which is preferably bromine or chlorine. The compounds formed from this reaction have the general formula:

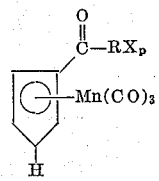

in which X is a halogen, as defined above, R is a hydrocarbon group containing from one to 20 carbon atoms as defined above, and p is an integer ranging from one to 3. The reaction take place by the displacement of hydrogen atoms from the end carbon atom of the hydrocarbon group R with halogen atoms. Three such hydrogen atoms can be displaced by the halogen using extremely mild conditions. The first hydrogen atom comes off fairly readily, while the latter 2 hydrogen atoms come off with more difficulty. Generally, the reaction mixture is cooled to a tempearture in the order of 0° C. and the halogen is added gradually to the acylcyclopentadienyl manganese tricarbonyl reactant. A non-reactive solvent, which is preferably an ether, is used in the reaction. The product is separated from the reaction mixture through recrystallation or very mild heating under high vacuum. In either event, the use of excess heat in the product separation step should be avoided. To further illustrate this process and the products formed thereby, there is presented the following example in which all parts and percentages are presented by weight unless otherwise indicated.

Example II

To a solution of 24.6 grams (0.1 mole) of acetylcyclopentadienyl manganese tricarbonyl in 250 ml. of ether cooled to 0° C. was added 16.0 grams (0.1 mole) of bromine dropwise with stirring. The rate of addition was controlled to coincide with the disappearance of the bromine color and required ½ hour. Stirring was continued for an additional ½ hour after which the ether and hydrogen bromide was removed by distillation at reduced pressure. The yellow-orange compound, bromoacetylcyclopentadienyl manganese tricarbonyl, could be recrystallized from ether and is soluble in organic solvents. The yield was 27 grams or 83 percent of theory having a melting point of 75–77° C.

Analysis.—Calcd. for $C_{10}H_6MnO_4Br$: C, 36.9; H, 1.85; Mn, 16.9; Br, 24.6. Found: C, 37.1; H, 1.93; Mn, 17.0; Br, 24.8 percent.

The haloacylcyclopentadienyl manganese tricarbonyl compound formed from the preceding process may be reacted with a tertiary amine, preferably pyridine, to form a tertiary amine salt. This is illustrated by the following typical tertiary amine salt which is formed by the reaction of pyridine and bromoacetylcyclopentadienyl manganese tricarbonyl:

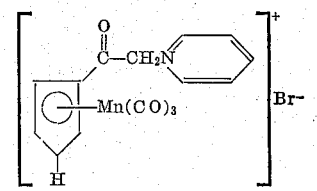

Our process can be carried out at room temperature or slightly higher in the presence of any common solvent. Further, the reaction can be carried out in the presence of air. To further illustrate this process, there is presented the following example in which all parts and percentages are presented by weight unless otherwise indicated.

Example III

To 9.75 grams (0.03 mole) of bromoacetylcyclopentadienyl manganese tricarbonyl dissolved in 60 ml. of acetone was added 2.38 grams (0.03 mole) of pyridine. When the resulting mixture was heated to boiling, a yellow crystalline precipitate formed. Heating was continued for 15 minutes; then the solution was cooled and filtered and the filter cake was washed with acetone. The yield of air dried product was 11.3 grams or 93 percent of theory having a M.P. with decomposition of 217–218° C. The material, pyridine salt of bromoacetylcyclopentadienyl manganese tricarbonyl, is soluble in water and virtually insoluble in organic solvents including acetone.

*Analysis.*—Calcd. for $C_{15}H_{11}MnO_4NBr$: Mn, 13.6; Br, 19.9; H, 2.73; N, 3.46. Found: Mn, 13.6, Br, 20.1; H, 2.84; N, 3.31 percent.

One of the types of tertiary amine salts of haloacylcyclopentadienyl manganese tricarbonyl, as formed in the preceding reaction, is the pyridine salt of a haloacetylcyclopentadienyl manganese tricarbonyl. Such salts have the following formula:

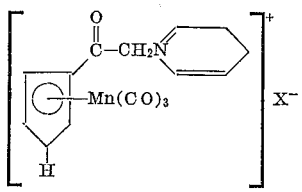

in which X is a halogen. The pyridine group, although not illustrated as such, can be substituted with hydrocarbon groups. The pyridine haloacetylcyclopentadienyl manganese tricarbonyl salts can be reacted with an equimolar quantity of a base to form an enolbetaine compound having the following formula:

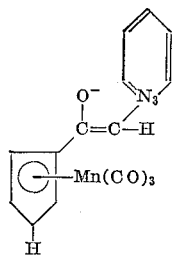

in which the pyridine ring can be substituted with hydrocarbon groups. In the course of this reaction, a hydro halogen acid is formed. The type of acid formed is determined by the halogen anion in the pyridinium salt reactant. If, for example, the anion is bromine, the acid formed will be hydrogen bromide. The purpose of the base in the reaction is to neutralize the hydro halogen acid which is formed. Generally, the reaction can be conveniently carried out by heating the reaction mixture at the reflux temperature of the system. This aspect of our invention is illustrated more fully by way of the following example in which all parts and percentages are by weight unless otherwise indicated.

Example IV

To 8.08 grams (0.02 mole) of the pyridinium salt of bromoacetylcyclopentadienyl maganese triacarbonyl dissolved in 125 ml. of water was added 0.8 gram (0.02 mole) of sodium hydroxide in 10 ml. of water dropwise with stirring. A precipitate forms after the first drop of sodium hydroxide is added. When first formed, the precipitate is yellow and then immediately turns orange. Stirring is continued for ½ hour after addition is complete. The reaction mixture is then filtered, washed with water, and dried over $P_2O_5$ in a vacuum desiccator. The yield of orange amorphous solid is 6.2 grams or 96 percent of theory. This material, 1-[2-oxa-2-(tricarbonylmanganocyclopentadienyl)ethyl]pyridinium enol-betaine, darkens at 169° C. and melts with decomposition at 171–174° C. The Beilstein test for halogen is negative.

*Analysis.*—Calcd. for $C_{15}H_{10}MnO_4N$: Mn, 17.0; H, 3.09; N, 4.34. Found: Mn, 17.0; H, 3.2, N, 3.84 percent.

When the enol-betaine was dissolved in acetone it gave a bright orange color. Anhydrous hydrogen bromide in acetone was added until this color disappeared and there was regenerated the pyridinium salt described in Example III. Boiling the compound in distilled water failed to dissolve it or affect it in any way. It was soluble to some extent in most organic solvents.

When two moles of base is used in the process just described, a salt of carboxycyclopentadienyl manganese tricarbonyl is formed. The salt, as illustrated by the sodium salt of carboxycyclopentadienyl manganese tricarbonyl, can then be acidified to yield carboxycyclopentadienyl manganese tricarbonyl. The acidification reaction is performed readily by mixing an acid which is stronger than carboxycyclopentadienyl manganese tricarbonyl with the salt of carboxycyclopentadienyl manganese tricarbonyl. Both the formation of the salt and its acidification to form the carboxy acid of cyclopentadienyl manganese tricarbonyl are illustrated by the following examples.

Example V

When 4.8 grams (0.12 mole) of sodium hydroxide in 50 ml. of water was added dropwise with stirring to 21.9 grams (0.054 mole) of the pyridinium salt of bromoacetylcyclopentadienyl manganese tricarbonyl in 300 ml. of water a voluminous orange precipitate formed. The mixture was then heated to boiling for 15 minutes during which time the solids dissolved. It was then cooled, saturated with NaCl, acidified to a Congo-red end point, and extracted with ether. Solvent was removed by distillation, yield 13.2 grams, 98.6 percent of theory, of carboxycyclopentadienyl manganese tricarbonyl having a melting point of 190–194° C. Recrystallization from toluene raised the M.P. to 195–196.5° C. This acid can also be prepared by treating the enolbetaine compound of Example IV with NaOH on a mole for mole basis under similar conditions. When the preceding reactions were carried out using only a minimum of isolation procedures the acid can be obtained in 78.5 percent starting from acetylcyclopentadienyl manganese tricarbonyl. The acid is virtually completely insoluble in many organic solvents such as, benzene and toluene at room temperature and in boiling carbon tetrachloride.

*Analysis.*—Calcd. for $C_9H_5MnO_5$: C, 43.5; H, 2.18; Mn, 22.2. Found: C, 43.7; H. 2.12; Mn, 21.9 precent.

The carboxycyclopentadienyl manganese tricarbonyl, formed as in the preceding example, can then be reacted with a compound such as phosphorus pentachloride, phosphorus trichloride or thionyl chloride to form a halocarbonylcyclopentadienyl manganese tricarbonyl. This reaction is customarily carried out in the presence of a nonreactive solvent. Some heating of the reaction mixture is necessary to initiate the reaction. To further illustrate this species of our invention, there is presented the following example.

Example VI

A mixture of 5 grams (0.0202 mole) of carboxycyclopentadienyl manganese tricarbonyl, 5 ml. of thionyl chloride and 50 ml. of carbon tetrachloride was heated to reflux for 45 minutes in a nitrogen atmosphere. A dark green solution resulted. The solvent and excess thionyl chloride were removed by distillation under reduced pressure. The crude product, which was chloroacetylcyclopentadienyl manganese tricarbonyl, weighed 5.25 grams, 98.5 percent of theory, and had a M.P. of 57–60° C. One recrystallization from petroleum ether (B.P. 30–60° C.) raised the melting point to 58–60° C.

*Analysis.*—Calcd. for $C_9H_4MnOCl$: C, 40.6; H, 1.50; Mn, 20.5; Cl, 13.3. Found: C, 40.9; H, 1.58; Mn, 20.6; Cl, 13.4 percent.

The reaction was then repeated using phosphorus pentachloride as the chlorinating agent. A mixture of finely ground $PCl_5$ (6.25 grams, 0.03 mole) and carboxycyclopentadienyl manganese tricarbonyl (7.44 grams, 0.03 mole) was warmed gently to start the reaction. After the initial vigorous reaction had subsided, heating on a steam bath was resumed for ½ hour. Then 100 ml. of benzene was added and the $POCl_3$ formed in the reaction was removed by codistillation under reduced pressure. Recrystallization from petroleum ether yielded 6.5 grams, 81.4 percent yield of chlorocarbonylcyclopentadienyl manganese tricarbonyl having a melting point of 58–60° C.

The halocarbonylcyclopentadienyl manganese tricarbonyl compound, formed in the manner of the preceding example, can then be reacted with a metal azide to form a compound having the following formula:

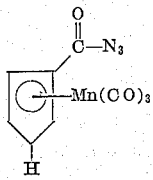

in which the cyclopentadienyl ring can be substituted with hydrocarbon groups containing from one to 8 carbon atoms. A preferred metal azide for use in this reaction is sodium azide. The reaction mixture is generally cooled during the reaction since metal azides can be explosive when heated. The reaction is carried out in the presence of a solvent which does not react with the halocarbonylcyclopentadienyl manganese tricarbonyl reactant. Preferred solvents are acetone and ketones in general. To further illustrate this embodiment of our invention, there is presented the following example.

*Example VII*

To a stirred solution of 7.0 grams (0.26 mole) of chlorocarbonylcyclopentadienyl manganese tricarbonyl in 65 ml. of acetone at 0° C. was added 2 grams (0.308 mole) of sodium azide in 6 ml. of water. Stirring was continued for 45 minutes at 0° C. and there was then added 100 ml. of water. After extracting the reaction mixture with ether, solvent was removed under reduced pressure. The yield of crude product was 7.0 grams, 97.8 percent, with a melting point of 39–41° C. The Beilstein test for halogen was negative. Recrystallization from petroleum ether (B.P. 37–43° C.) raised the melting point of the yellow crystals, azidocarbonylcyclopentadienyl manganese tricarbonyl, to 40–42° C.

*Analysis.*—Calcd. for $C_9H_4MnO_4N_3$: Mn, 20.2. Found: Mn, 20.0. The compound has good solubility in most organic solvents.

The azidocarbonylcyclopentadienyl manganese tricarbonyl, as prepared in the previous example, can be employed as a starting material in a process for forming aminocyclopentadienyl manganese tricarbonyl. This process requires two steps. In the first step, the azidocarbonylcyclopentadienyl manganese tricarbonyl is heated in the presence of a neutral solvent and in the absence of water or alcohol in the reaction mixture. The intermediate formed from this step is then separated from the neutral solvent by, for example, heating under reduced pressure. The intermediate is then hydrolyzed to form aminocyclopentadienyl manganese tricarbonyl. This embodiment of our invention is illustrated by the following example in which all parts and percentages are presented by weight unless otherwise indicated.

*Example VIII*

Fifteen grams (0.055 mole) of recrystallized azidocarboncyclopentadienyl manganese tricarbonyl was dissolved in 100 ml. of toluene which had been dried by distillation from sodium benzophenone ketyl. The solution was then rapidly heated to reflux for 1.5 hours in oven dried glassware under a nitrogen atmosphere. Nitrogen evolved slowly during the heating period; the clear yellow solution became very dark and suspended solids could be observed. At the end of the heating period, the dark brown solids were removed from the cooled mixture be filtration. This material, after washing first with toluene then with ether followed by drying in vacuo, weighed 4.6 grams. It failed to sublime at 160° C. and full pump vacuum and was insoluble in most organic solvents with the exception of acetone. The infrared spectrum showed the metallo-carbonyl absorption characteristic of cyclopentadienyl manganese tricarbonyl type compounds with bands at 2.8 and 4.5 microns. Solvent was removed from the filtrate by distillation at reduced pressure, and there was then added to the viscous oily residue 100 ml. of 25 percent potassium hydroxide. This mixture was heated to reflux for 1.5 hours, cooled, extracted with ether and dried over magnesium sulfate. Removal of solvent followed by sublimation at 90° C. yielded 4.7 grams of aminocyclopentadienyl manganese tricarbonyl. The compound was a yellow solid which melted at 75–76° C., appears quite stable in the solid state, and is soluble in most organic solvents. It forms a hydrochloride when treated with hydrogen chloride.

*Analysis.*—Calcd. for $C_8H_6MnNO_3$: C, 43.8; H, 2.74; Mn, 25.1; N, 6.39. Found: C, 44.0; H, 2.90; Mn, 25.0; N, 6.36 percent.

Another form of our invention involves the reduction of an acylcyclopentadienyl manganese tricarbonyl compound to form the corresponding alkylcyclopentadienyl manganese tricarbonyl compound. The acylcyclopentadienyl manganese tricarbonyl reactant used in this embodiment of our invention has the formula:

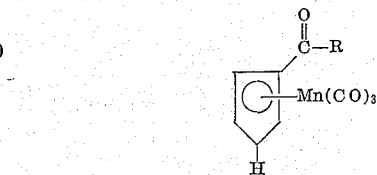

as described previously in this application. The reduction is carried out by treating the acylcyclopentadienyl manganese tricarbonyl with a reducing metal, which is preferably zinc, in the presence of hydrogen chloride. A more preferred reducing metal is amalgamated zinc. The reaction is carried out in the presence of an inert solvent, such as benzene, which is used to dissolve the acylcyclopentadienyl manganese tricarbonyl reactant. Since the reducing metal and hydrochloric acid are not soluble in the solvent used to dissolve the acylcyclopentadienyl manganese tricarbonyl, a small amount of a second solvent is added to the reaction mixture. This solvent may be any polar solvent, but is preferably alcohol or dioxane. The function of the second solvent is to provide at least some mutual solubility between the two phases of the reaction system. To illustrate this mode of our invention, there are presented the following examples.

*Example IX*

Amalgamated zinc was prepared by adding 10 grams (0.04 mole) of mercuric chloride dissolved in 75 ml. of water and 5 ml. of concentrated hydrochloric acid to 100 grams (1.5 moles) of zinc. After shaking the mixture, the water was poured off and the amalgamated zinc was washed with small portions of distilled water. To the amalgamated zinc was then added 100 ml. of concentrated hydrochloric acid, 25 ml. of ethanol, followed by the addition of 50 grams (0.2 mole) of acetylcyclopentadienyl manganese tricarbonyl dissolved in 100 ml. of benzene. The entire mixture was heated to rapid reflux and two 50 ml. portions of concentrated hydrochloric acid were added at four hour intervals. After heating at reflux for 24 hours, the mixture was extracted with ether; the ether layer washed with water and dried over magnesium sulfate. After removal of the solvents, the residues were distilled to give three fractions (24 grams, 52.3 percent yield) of ethylcyclopentadienyl maganese tricarbonyl boiling at 61° C. at 0.7 mm. Hg, 58–61° C. at 0.7 mm. Hg, and 56–58° C. at 0.7 mm. Hg. Vapor phase chromatography showed the compound to be 99.9+ percent pure. Infrared analyses confirmed that the product was ethylcyclopentadienyl manganese tricarbonyl.

Example X

Amalgamated zinc was prepared as described in Example IX. To the amalgamated zinc was added 100 ml. of concentrated hydrochloric acid and 25 ml. of ethanol, followed by the addition of 37 grams (0.13 mole) of n-valeryl cyclopentadienyl manganese tricarbonyl dissolved in 100 ml. of benzene. Two 50 ml. portions of concentrated hydrochloric acid were then added at four hour intervals. After the mixture had been heated to reflux the product was isolated as described in Example IX and distilled at 82° C. at 0.4 mm. Hg to yield 8.9 grams of n-amylcyclopentadienyl manganese tricarbonyl.

*Analysis.*—Calcd. for: $C_{13}H_{15}MnO_3$: C. 57.0; H, 5.52; Mn, 19.9 Found: C, 57.2; H, 5.63; Mn 20.0 percent.

Example XI

Amalgamated zinc was prepared as described in Example IX. After the addition of 100 ml. of concentrated hydrochloric acid to the amalgamated zinc, 36.6 grams (0.127 mole) of iso-valeryl cyclopentadienyl maganese tricarbonyl, 100 ml. of toluene and 25 ml. of dioxane were added. The mixture was then heated to rapid reflux with rapid stirring for forty-five hours. After the general isolation procedure described in Example IX, the product was distilled at 72–76° C. at 0.04–0.075 mm. A yield of 25.3 grams of isoamylcyclopentadienyl maganese tricarbonyl was obtained.

Another aspect of our invention involves the reaction of an acylcyclopentadienyl manganese tricarbonyl, as defined previously, with a metal hydride. A preferred metal hydride is lithium aluminum hydride. This reaction is carried out in the presence of a non-reactive solvent which is preferably an ether. The reaction is normally carried out at the reflux temperature of the solvent in the presence of an inert atmosphere. There is formed a (1-hydroxyalkyl) cyclopentadienyl manganese tricarbonyl compound. To further illustrate this form of our invention, there is presented the following example.

Example XII (1-hydroxyethyl) cyclopentadienyl maganese tricarbonyl was prepared by treatment of 72 grams (0.293 mole) of acetylcyclopentadienyl maganese tricarbonyl in ether solution with 5.7 grams (0.15 mole) of lithium aluminum hydride. The acetylcyclopentadienyl manganese tricarbonyl was dissolved in 500 ml. of ether and the solid lithium aluminum hydride was added in small portions to the stirred solution at room temperature in an atmosphere of nitrogen. Each adidtion was accompanied by a small amount of foaming and heat was evolved. The addition was regulated to keep the ether refluxing at a moderate rate and required slightly more than one hour during which time the color changed from red-orange to brown. The mixture was then allowed to stand overnight in a nitrogen atmosphere. Methyl formate was then added dropwise to remove excess lithium aluminum hydride, after which water was added dropwise with caution until there was no further evidence of reaction. The mixture was then filtered, and the organic layer was separated from the filtrate. The solid was acidified and then extracted with ether and the ether extract was combined with the organic layer. The combined extracts were washed with sodium carbonate solution and dried over Drierite. Removal of the ether followed by distillation through a small spinning band column gave 46 grams (0.186 mole) of (1-hydroxyethyl)cyclopentadienyl manganese tricarbonyl, a mobile orange liquid having a boiling point of 104–106° C. at 22 mm. and a refractive index, $n_D^{20}$ of 1.5967.

*Analysis.*—Calcd. for $C_{10}H_9MnO_4$: C, 48.4; H, 3.63; Mn, 22.2. Found: C, 48.6; H, 3.72; Mn, 22.2. The infrared spectrum was characterized by the relatively weak hydroxyl absorption at 2.8–2.9 microns and the disappearance of ketonic absorption at 6.9 microns.

The (1-hydroxy alkyl)cyclopentadienyl mangaese tricarbonyl compound, formed as in the preceding example, can then be reacted with a dehydration catalyst to form the corresponding vinylcyclopentadienyl manganese tricarbonyl. A preferred dehydration catalyst is potassium hydrogen sulfate. To further illustrate this embodiment of our invention, there is presented the following example.

Example XIII

Vinylcyclopentadienyl manganese tricarbonyl was prepared by treatment of 18.95 grams (0.076 mole) of (1-hydroxyethyl)cyclopentadienyl manganese tricarbonyl with 1.2 grams of powdered potassium hydrogen sulfate and 200 mg. of tert-butylcatechol added as a polymerization inhibitor. The flask containing these materials was attached to a preheated spinning bank column and the pressure was adjusted to 97 mm. Hg. The band was started and the flask was immersed in an oil bath heated to 170° C. Water was seen collecting in the condenser almost immediately. After 10 minutes the pressure was lowered to ~2 mm. and the distillate boiling at 88° C. was removed very rapidly. The yield of crude product was 14.5 grams. A careful refractionation gave 13.7 grams of product as a mobile orange liquid having a boiling point of 88° C. at 3 mm.

*Analysis.*—Calcd. for $C_{10}H_7MnO_3$: C, 52.2; H, 3.04; Mn, 23.9 Found: C, 52.4; H, 3.11; Mn, 23.9 percent. The infrared spectrum of the compound showed characteristic vinyl absorption at 6.1 microns.

The vinylcyclopentadienyl manganese tricarbonyl, as prepared in the preceding example, can be polymerized by heating in a partially evacuated system. This is illustrated by the following example.

Example XIV

Polymerization of vinylcyclopentadienyl manganese tricarbonyl is carried out by immersing a partially evacuated tube containing the vinyl compound in an oil bath at 170° C. One sample was immersed for 66 hours, and another was immersed 22 hours. The polymer obtained in both samples showed no vinyl absorption in the infrared and was a clear orange, brittle glasslike solid with little resistance to shear. It can be dissolved in benzene or chloroform and films cast from these solutions are clear but brittle. It can be precipitated from benzene by the addition of methanol. The softening point is around 80° C. The polymer reacts slowly with concentrated nitric acid and tends to darken on prolonged exposure to light.

Another form of our invention involves the reaction between an acylcyclopentadienyl manganese tricarbonyl, as previously defined, and a hydrazine compound having the formula:

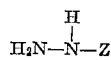

in which Z is a hydrocarbon group containing from one to about 18 carbon atoms which can be an aryl, an alkyl, or a cycloalkyl group. A preferred form is the reaction of acetylcyclopentadienyl manganese tricarbonyl with phenyl hydrazine to form the phenyl hydrazone derivative of acetylcyclopentadienyl manganese tricarbonyl. This compound is a valuable intermediate since it can be used to prepare the indole derivative of cyclopentadienyl manganese tricarbonyl. The reaction is generally carried out in the presence of a neutral solvent by heating the reaction mixture at reflux for a short period of time at a temperature of about 100° C. To further illustrate this form of our invention, there is presented the following example.

*Example XV*

A solution comprising 5 grams of acetylcyclopentadienyl manganese tricarbonyl dissolved in 50 ml. of ethanol was heated with 2.1 grams of phenyl hydrazine on a steam bath for 10 minutes. The reaction mixture was then cooled and diluted with 3 ml. of water and filtered to yield 6.3 grams of yellow crystals which were the phenyl hydrazone derivative of acetylcyclopentadienyl manganese tricarbonyl. The crystals had a melting point of 105–107° C. On further dilution of the filtrate with water, there were obtained an additional 0.4 gram of the phenyl hydrazone derivative having a melting point of 104–106° C. The total yield of product was 98.5 percent.

The phenyl hydrazone derivative of acetylcyclopentadienyl manganese tricarbonyl can then be treated with a Lewis acid catalyst in the presence of concentrated hydrochloric acid to yield the indole derivative of cyclopentadienyl manganese tricarbonyl. A preferred Lewis acid catalyst for this reaction is zinc chloride. To further illustrate this aspect of our invention, there is presented the following example.

*Example XVI*

Acetylcyclopentadienyl manganese tricarbonyl phenyl hydrazone (4 grams) and zinc chloride (20 grams) were heated on an oil bath at 100° C. The temperature was raised to 170° C. over a 30-minute period while stirring the mixture. The mixture was kept at 170° C. for 10 minutes after which 20 grams of sand were added and mixed into the original mixture. After cooling, the mixture was diluted with water (100 ml.) and concentrated hydrochloric acid (3 ml.) and heated on the steam bath for 1½ hours.

The cooled mixture was filtered and the residue was boiled with ethanol (100 ml.) and Norit–A. The mixture was filtered through celite; the celite was washed with hot ethanol and the filtrate and washings were combined and evaporated on a steam bath. The residue was triturated several times with a boiling mixture of benzene-petroleum ether (1:1 volume ratio), and the organic solvents were collected, filtered, and concentrated to a small volume. On cooling, there were obtained two grams of yellow crystals having a melting point of 132–134° C. The filtrate afforded another 0.9 grams of crystals on cooling. An analytical sample was crystallized from benzene-petroleum ether and had a melting point of 135–136° C.

Calculated for $C_{16}H_{10}NMnO_3$: C, 60.1; H, 3.13; N, 4.30; Mn, 17.2. Found: C, 60.5; H, 3.40; N, 3.95; Mn, 17.3.

Another aspect of our invention involves the reaction between an acylcyclopentadienyl manganese tricarbonyl compound, as previously described, and an ester having the general formula:

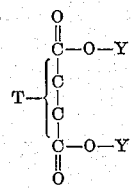

In the ester reactant shown above, Y is an alkyl group containing from one to about 8 carbon atoms and T is a hydrocarbon group which is connected to either one or the other of the two middle carbon atoms of the ester. T can be an alkyl group, an aralkyl group, or an aryl group and can contain from one to about 18 carbon atoms. There are formed from this reaction the following products:

(I)
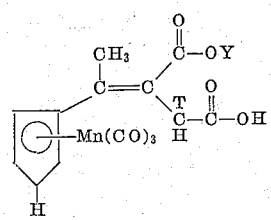

(II)
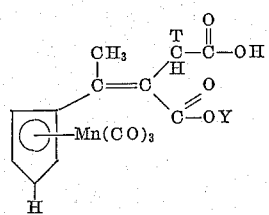

and (III)
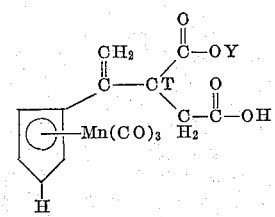

Products I, II, and III, as shown above, are the half-ester condensation products of an acylcyclopentadienyl manganese tricarbonyl compound, as described previously, and the ester reactant as defined above. In the course of the condensation, water is formed and this results in the hydrolysis of one of the ester groups in the ester reactant to convert it to an acid. To further illustrate this form of our inpention, there are presented the following examples in which all parts and percentages are by weight unless otherwise indicated.

*Example XVII*

A three-necked flask equipped with a stirrer and a condenser, the top of which led to a source of nitrogen and reduced pressure, was evacuated, flame dried and filled with dry nitrogen. With nitrogen flowing, sodium hydride (21.6 grams) was washed into the flask with dry benzene (200 ml.) followed by a solution of acetylcyclopentadienyl manganese tricarbonyl (75 grams) in benzene (150 ml). Freshly distilled diethyl succinate (160 grams) was then added. Nitrogen flow was stopped and the stirrer was started. A slight evolution of gas was observed for a few minutes which then stopped and during about 30 minutes of stirring no reaction appeared to take place. After that time, a sudden darkening in color was observed and strong evolution of gas began to take place. The reaction vessel was cooled in an ice-water bath and stirring was continued for 1 hour until the gas evolution slowed down. The cooling bath was removed and stirring was continued for another hour at room temperature when the gas evolution practically ceased. The reaction mixture was then cooled again with an ice-water bath and glacial acetic acid (60 ml.) was added dropwise with vigorous stirring. This was then followed by ether (300 ml.) and water (200 ml.) and stirring was continued for another half hour. Changes in color from brown to green and back to brown took place during the addition of the acetic acid and the ether. The mixture was then filtered to remove about 3.5 grams of a greenish precipitate, A. The filtrate was separated into the organic and aqueous layers. The aqueous layer was washed twice with ether and discarded. The ether washings were combined with the organic layer and extracted with 6 x 250 ml. of 5 percent sodium carbonate solution, B, then with 4 x 200 ml. 5 percent potassium hydroxide solution, C. The remaining organic layer D, was washed with 3 x 200 ml. water, dried over sodium sulfate, and distilled under vacuum to recover about 65 grams of diethyl succinate.

*Example XVIII*

The sodium carbonate extract, B, from Example XVII was acidified with hydrochloric acid, extracted with ether, and the ether extract was dried over sodium sulfate and evaporated to dryness to obtain 85 grams of a viscous brown-reddish oil which semisolidified on standing. Trituration with 100 ml. of an ether-petroleum ether solvent mixture (1:1 volume ratio) and filtration yielded 12 grams, $B_1$, of yellow crystals, M.P. 100–110° C.

One recrystallization from a carbon tetrachloride-benzene mixture gave crystals with a melting point of 119–120° C.

*Analysis.*—Calcd. for the alkylidene half ester $C_{16}H_{15}MnO_7$:

C, 51.3; H, 4.01; Mn, 14.7. Found: C, 50.9; H, 3.88; Mn, 15.1 percent.

The filtrate obtained after separating the crystalline half ester was evaporated and the residue was triturated with ether/petroleum ether (1:1 volume ratio) as before to obtain on filtration another 12 grams of crystals, $B_2$. Repeating the procedure but triturating with carbon tetrachloride produced 2 grams of crystals, $B_3$, whose infrared spectrum was identical with that of $B_2$. Both $B_2$ and $B_3$, however, had similar but not identical infrared spectra with $B_1$. Repeating the $CCl_4$ procedure with the filtrate residue, there was obtained another 1 gram of crystals, M.P. 245° C. (dec.), $B_4$. The infrared spectrum of $B_4$ was very different from those of $B_1$, $B_2$, and $B_3$. The filtrate from the last trituration was evaporated to obtain 50 grams of semi-solid yellow material, $B_5$, which was probably a mixture of isomeric half esters.

*Example XIX*

The crystalline half ester, $B_1$ (10 grams) was refluxed with barium hydroxide trihydrate (12 grams) in ethanol (200 ml.) and water (200 ml.) with continuous stirring for 18 hours. After cooling and filtering, the barium salt was collected, treated with dilute hydrochloric acid and extracted with ether. The ether extract was dried over sodium sulfate and evaporated to yield 9.2 grams of crystalline material, M.P. 120–125° C. Recrystallization from chloroform and chloroform/ether gave the analytical sample, M.P. 129–130° C.

*Analysis.*—Calcd. for the dibasic acid, $C_{14}H_{11}MnO_7$: C, 48.5; H, 3.18; Mn, 15.9. Found: C, 48.8; H, 3.05; Mn, 16.1.

*Example XX*

The crystalline compound $B_2$ (10 grams) was hydrolyzed with barium hydroxide as described above, but reflux was only for 6 hours. After work-up as before, there was obtained 13 grams of barium salt from which was obtained 9.9 grams of viscous oily material, after acidification and ether extraction.

Trituration with ether/petroleum ether and filtration afforded 2.6 grams of crystals, M.P. 148–155° C. which upon recrystallization gave crystals of a dibasic acid having a melting point of 157–158° C.

*Analysis.*—Calcd. for $C_{14}H_{11}MnO_7$: C, 48.5; H, 3.18; Mn, 15.9. Found: C, 48.3; H, 3.11; Mn, 16.0 percent.

The filtrate from the initial trituration was evaporated to dryness, the residue dissolved in a minimum amount of chloroform and allowed to stand. There was obtained 5.5 grams of crystals M.P. 124–125° C. which when recrystallized from chloroform/ether gave crystals of M.P. 129–130° C., identical with the dibasic acid obtained from the hydrolysis of $B_1$ in Example XIX.

*Example XXI*

Thirty grams of the semi-solid yellow material, $B_5$, referred to in Example XVIII, was hydrolyzed in 200 ml. of ethanol and 60 ml. of 25 percent potassium hydroxide and 100 ml. of water. The mixture was allowed to stand at room temperature for 64 hours after which it was refluxed for 4 hours. The volume was then reduced in half, acidified with hydrochloric acid and extracted with ether. The ether extract was boiled with Norit-A, filtered and dried over sodium sulfate. The extract was then filtered again and the filtrate was heated to evaporate off the ether. There was obtained 24 grams of a yellow oil which solidified on standing. The oil was triturated with hot chloroform; the resulting solution was allowed to stand for ½ hour and it was then filtered. The residue was washed with chloroform and petroleum ether to yield 8 grams of yellow crystals having a melting point of 166–167° C. The crystals were recrystallized from ether/chloroform to give crystals having a melting point of 167–168° C. This material was another dibasic acid derivative of cyclopentadienyl manganese tricarbonyl as shown by I, II, and III, above.

On analysis, there was found: C, 48.3; H, 3.17; Mn, 16.0. Calcd. for $C_{14}H_{11}MnO_7$: C, 48.5; H, 3.18; Mn, 15.9 percent.

A still further form of our invention involves the reaction between acetylcyclopentadienyl manganese tricarbonyl, a tertiary amine or base, and a hydroxyl amine hydrohalide to form the oxime derivative of an acylcyclopentadienyl manganese tricarbonyl. This form of our invention is illustrated by the following example.

*Example XXII*

To 10 grams (0.04 mole) of acetylcyclopentadienyl manganese tricarbonyl dissolved in a mixture consisting of 50 ml. of pyridine and 50 ml. of ethanol was added 2.9 grams (0.042 mole) of hydroxylamine hydrochloride. The resulting mixture was heated on a steam bath for 2 hours, and the solvent was then evaporated under reduced pressure leaving a viscous oil. When the oil was triturated thoroughly with 50 ml. of water it solidified. The solids were filtered off and dried over phosphorus pentoxide in a vacuum desiccator to give 10.1 grams of crude product having a melting range of 80–90° C. Two recrystallizations from methanol-water mixtures gave yellow crystals which were dried over phosphorus pentoxide and had a melting range of 98–101° C. The compound which is the oxime derivative of acetylcyclopentadienyl manganese tricarbonyl is soluble in most organic solvents with the exception of petroleum ether.

*Analysis.*—Calcd. for $C_{10}H_8MnO_4N$: C, 46.0; H, 3.07; Mn, 21.1; N, 5.36. Found: C, 46.1; H, 3.19; Mn, 21.2; N, 5.43 percent.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylene dibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity of the base oil. In addition, they may be employed as additives to solid fuels to control burning rate.

Our compounds are further useful in many metal plating applications. In order to effect metal plating using the compounds, they are decomposesd in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of bromoacetylcyclopentadienyl manganese tricarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility for our compounds is their use as chemical intermediates in the preparation of metal-containing polymeric materials or in the preparation of new organic materials.

Having fully defined the novel compounds of our invention, their mode of preparation and their many utilities, we desire to be limited only within the lawful scope of the appended claims.

We claim:
1. Process comprising reacting a halocarbonylcyclopentadienyl manganese tricarbonyl compound with a metal azide to form the compound having the formula:

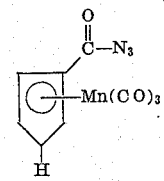

said process being carried out in acetone and at a temperature of about 0° C.

2. The process of claim 1 wherein the metal azide is sodium azide.

3. The process of claim 1 wherein said halocarbonylcyclopentadienyl manganese tricarbonyl is chlorocarbonylcyclopentadienyl manganese tricarbonyl and said metal azide is sodium azide.

4. Azidocarbonylcyclopentadienyl manganese tricarbonyl.

No references cited.

WALTER A. MODANCE, *Primary Examiner.*
ROBERT T. BOND, *Assistant Examiner.*